US012723431B2

(12) United States Patent
Romero et al.

(10) Patent No.: US 12,723,431 B2
(45) Date of Patent: Sep. 1, 2026

(54) LOCKSET ASSEMBLY WITH RETAINER AND METHOD OF INSTALLING THE SAME

(71) Applicant: ASSA ABLOY Americas Residential Inc., New Haven, CT (US)

(72) Inventors: Oscar Romero, Laguna Woods, CA (US); Matthew Ka Ho Cheng, Rancho Cucamonga, CA (US)

(73) Assignee: ASSA ABLOY Americas Residential Inc., New Haven, CT (US)

( * ) Notice: Subject to any disclaimer, the term of this patent is extended or adjusted under 35 U.S.C. 154(b) by 0 days.

(21) Appl. No.: 18/676,778

(22) Filed: May 29, 2024

(65) Prior Publication Data

US 2024/0401370 A1 Dec. 5, 2024

Related U.S. Application Data

(60) Provisional application No. 63/506,214, filed on Jun. 5, 2023.

(51) Int. Cl.
*E05B 3/00* (2006.01)
*E05B 3/06* (2006.01)
*E05B 1/00* (2006.01)

(52) U.S. Cl.
CPC .................................... *E05B 3/06* (2013.01)

(58) Field of Classification Search
CPC ... Y10T 292/82; Y10T 292/85; Y10T 292/91; E05B 3/00; E05B 3/06
See application file for complete search history.

(56) References Cited

U.S. PATENT DOCUMENTS 2,491,783 A * 12/1949 Thomas .................. E05C 1/163 292/357
2,810,600 A * 10/1957 Kendrick ................ E05B 15/02 292/357
3,647,252 A * 3/1972 Nolin ...................... F16B 43/02 292/357
3,716,261 A * 2/1973 Gerlach .................. E05C 1/163 292/357
5,118,152 A * 6/1992 Lin ....................... E05B 55/005 292/357

(Continued)

FOREIGN PATENT DOCUMENTS

DE 20213314 U1 * 11/2002 ............... E05B 3/06
DE 202004001556 U1 * 4/2004 ............ E05B 3/065

(Continued)

*Primary Examiner* — Carlos Lugo
(74) *Attorney, Agent, or Firm* — Merchant & Gould P.C.

(57) ABSTRACT

A lockset assembly includes a first knob assembly having a projection with an enlarged head. A second knob assembly is configured to couple to the first knob assembly along a first axis. The second knob assembly including a rose liner with an opening is configured to receive the enlarged head of the projection in a bayonet connection. A retainer is coupled to the rose liner. The retainer defines a pocket shaped and sized to at least partially receive the projection, and the pocket is axially aligned with the opening. As the enlarged head is received within the opening, the retainer resiliently deflects to capture the projection within the pocket restricting disengagement of the enlarged head from the opening.

19 Claims, 12 Drawing Sheets

(56) References Cited

U.S. PATENT DOCUMENTS

| | | | | |
|---|---|---|---|---|
| 5,409,278 | A * | 4/1995 | Harcourt | E05B 3/06<br>292/357 |
| 5,411,303 | A * | 5/1995 | To | E05B 3/06<br>292/357 |
| 5,433,497 | A * | 7/1995 | Koenig | E05C 1/163<br>292/169.14 |
| 6,532,629 | B2 * | 3/2003 | Armstrong | E05B 3/06<br>292/355 |
| 6,742,820 | B2 * | 6/2004 | Shen | E05B 55/005<br>292/357 |
| 6,745,602 | B2 | 6/2004 | Nakasone et al. | |
| 7,311,342 | B1 * | 12/2007 | Fan | E05B 15/02<br>292/357 |
| 11,391,058 | B2 * | 7/2022 | Schuberth | E05B 15/02 |
| 2008/0116699 | A1 * | 5/2008 | Karcher | E05B 3/06<br>292/357 |
| 2015/0069769 | A1 * | 3/2015 | Chen | E05B 15/02<br>292/357 |

FOREIGN PATENT DOCUMENTS

| | | | | |
|---|---|---|---|---|
| DE | 102021210229 | A1 * | 3/2023 | E05B 3/06 |
| EP | 1544384 | A1 * | 6/2005 | E05B 15/02 |
| JP | 2009270390 | A * | 11/2009 | E05B 3/06 |

* cited by examiner

LOCKSET ASSEMBLY WITH RETAINER AND METHOD OF INSTALLING THE SAME

CROSS-REFERENCE TO RELATED APPLICATION(S)

This application claims the benefit of priority to U.S. Provisional Application No. 63/506,214, filed Jun. 5, 2023, which application is hereby incorporated by reference in its entirety.

BACKGROUND

This disclosure relates generally to lockset assemblies and, more particularly, to a retainer for lockset assemblies that secures a bayonet connection between interior and exterior knob assemblies.

At least some known lockset assemblies have interior and exterior knob assemblies that are coupled together via a bayonet connection. The bayonet connection includes a pair of screws that extend from the exterior knob assembly, while the interior knob assembly has a rose liner with a pair of corresponding openings that receive the pair of screws. During assembly, the exterior knob assembly is aligned with a bore of a door with the screws extending therethrough. The interior knob assembly is then coupled to the exterior knob assembly with a head of the screws received within the openings of the rose liner. The screws can then be tightened from the interior knob assembly side to mount the lockset assembly on the door. During use and operation of the lockset assembly, however, movement of the screw heads relative to the rose liner may occur, thereby partially or fully releasing the bayonet connection between the interior and exterior knob assemblies. Improvements to lockset assemblies are desired to increase bayonet connection strength between the interior and exterior knob assemblies.

SUMMARY

The present disclosure relates generally to a lockset assembly having a retainer that is configured to provide alignment and retention to a screw/opening bayonet connection. The retainer is coupled to a knob assembly defining the opening such that when the screw is being engaged with the opening, the retainer resiliently deflects to allow for the opening to at least partially capture the screw and engage with the retainer. The retainer ensures alignment of the screw within the opening and restricts the screw from undesirably backing out of the bayonet connection.

In an aspect, the technology relates to a lockset assembly including: a first knob assembly including at least one projection having an enlarged head; a second knob assembly configured to couple to the first knob assembly along a first axis, the second knob assembly including a rose liner having at least one opening configured to receive the enlarged head of the at least one projection in a bayonet connection; and a retainer coupled to the rose liner, the retainer defining at least one pocket shaped and sized to at least partially receive the at least one projection, the at least one pocket axially aligned with the at least one opening, wherein as the enlarged head is received within the at least one opening, the retainer resiliently deflects to capture the at least one projection within the at least one pocket restricting disengagement of the enlarged head from the at least one opening.

In an example, the retainer has a substantially circular shape. In another example, the retainer is symmetrical about the first axis. In still another example, the at least one pocket is defined on an inner surface of the retainer. In yet another example, an edge defining the at least one pocket projects radially inward from an inner surface of the retainer. In an example, the at least one opening includes an axial portion and a circumferential portion, a portion of the at least one pocket covering a transition between the axial portion and the circumferential portion. In another example, the retainer includes at least one tab receiver configured to engage a corresponding tab of the rose liner. In still another example, the at least one tab receiver is a U-shaped hole, a square shaped hole, or a T-shaped hole.

In another aspect, the technology relates to a lockset assembly including: a first knob assembly including: a first knob rotatable around a first axis; a first rose liner; and at least one screw projecting from the first rose liner opposite the first knob and parallel to the first axis; and a second knob assembly including: a second knob rotatable around the first axis, the second knob coupled to the first knob via a torque blade; a second rose liner defining at least one opening configured to receive at least a portion of the at least one screw in a bayonet coupling; and a retainer coupled to the second rose liner, the retainer having at least one screw receiver disposed proximate the at least one opening, the at least one screw receiver restricting disengagement of the at least one screw from the at least one opening.

In an example, the retainer is formed from a different material than the second rose liner. In another example, the retainer is resiliently flexible to allow the at least one screw to be inserted into, and removed from, the at least one opening. In still another example, the at least one screw receiver is a pocket. In yet another example, the at least one screw is selectively rotatable when received at least partially within the at least one screw receiver. In an example, the second rose liner includes at least one ramp proximate the at least one opening, the retainer disposed radially outside of the at least one ramp. In another example, the second rose liner defines an interior cavity, the retainer completely disposed within the interior cavity. In still another example, the torque blade extends through the retainer.

In another aspect, the technology relates to a retainer for a lockset assembly, the retainer including: a main body configured to couple to a rose insert of an interior door knob assembly, the main body having a substantially circular shape symmetrical about two orthogonal planes, the main body being formed by a resiliently flexible material, the main body including: a first screw receiver forming a first open pocket on an inside surface of the main body; a second screw receiver forming a second open pocket on the inside surface of the main body, the second screw receiver facing the first screw receiver; a first mounting tab receiver defined as a first hole through the main body; a second mounting tab receiver defined as a second hole, the second mounting tab receiver facing the first mounting tab receiver and orthogonal to the first screw receiver; and a plurality of symmetric arms extending between one screw receiver and one mounting tab receiver.

In an example, the first and second screw receivers and the first and second mounting tab receivers protrude radially outward on the main body. In another example, the first and second screw receivers have a different thickness than the first and second tab receivers.

In another aspect, the technology relates to a method of installing a lockset assembly on a door, the method including: positioning a first knob assembly at a bore of the door that defines a first axis, the first knob assembly having at least one screw and a torque blade extending through the bore of the door; aligning a second knob assembly at the bore of the door to couple to the torque blade; pushing the second knob assembly towards the door; and concurrently while pushing the second knob assembly, rotating the second knob assembly around the first axis such that a rose liner having at least one opening at least partially captures the at least one screw in a bayonet connection, wherein rotating the second knob assembly resiliently deflects a retainer coupled to the rose liner to engage the at least one screw within at least one pocket restricting disengagement of the at least one screw from the at least one opening.

In an example, capturing the at least one screw within the at least one pocket includes generating an audible sound. In another example, the method further includes tightening the at least one screw, the at least once screw rotates relative to the retainer. In still another example the method further includes, prior to pushing the second knob assembly, rotating the second knob assembly around the first axis to position the at least one opening proximate the at least one screw, the at least one screw sliding directly against the retainer.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular examples of the present disclosure and therefore do not limit the scope of the present disclosure. The drawings are not to scale and are intended for use in conjunction with the explanations in the following detailed description. Examples of the present disclosure will hereinafter be described in conjunction with the appended drawings, wherein like numerals denote like elements.

DETAILED DESCRIPTION

Figure 1:
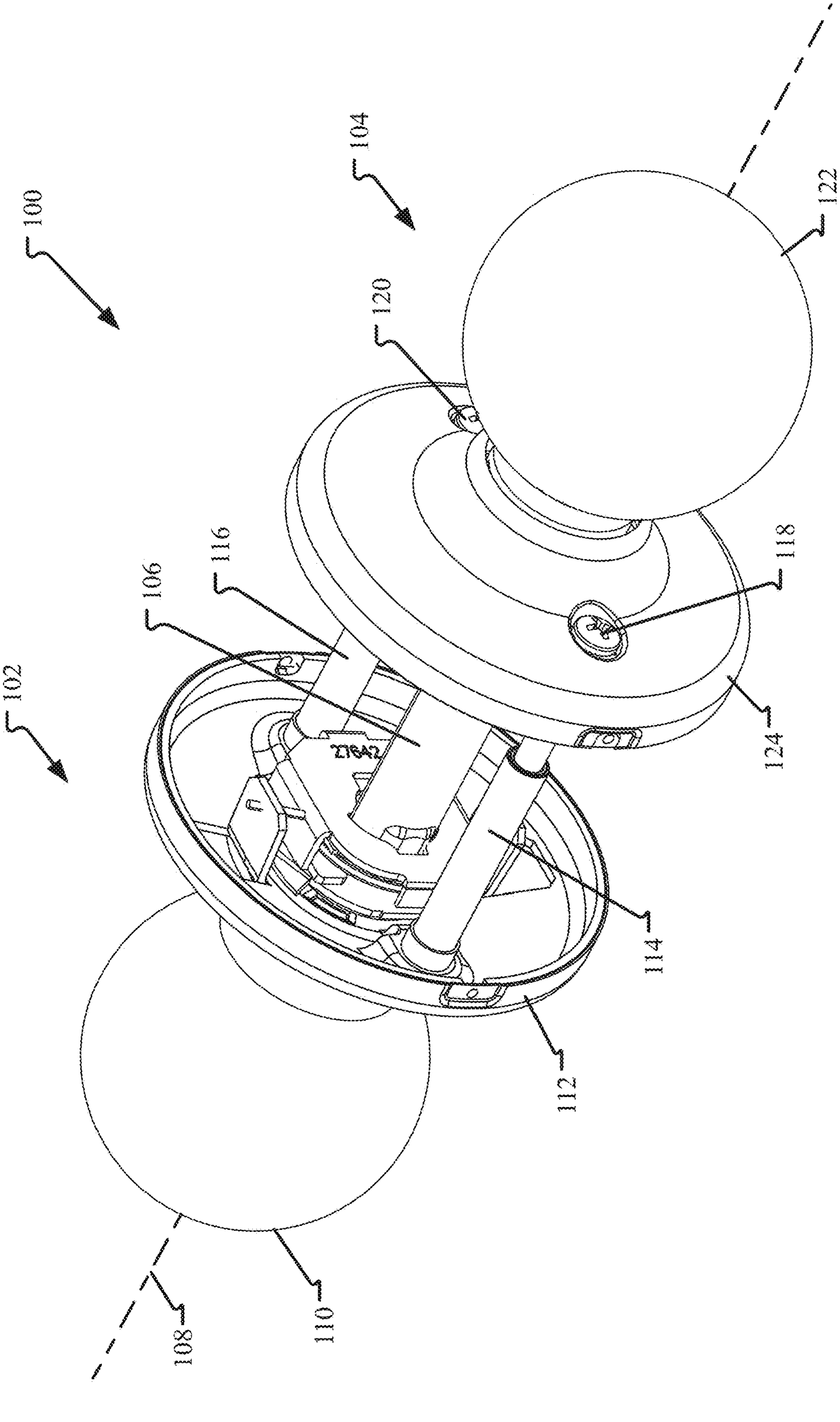
FIG. 1 is a perspective view of an exemplary lockset assembly in accordance with the principles of the present disclosure.

Various examples will be described in detail with reference to the drawings, wherein like reference numerals represent like parts and assemblies throughout the several views. Reference to various examples does not limit the scope of the claims attached hereto. Additionally, any examples set forth in this specification are not intended to be limiting and merely set forth some of the many possible embodiments for the appended claims.

A retainer for a lockset assembly is described below. The lockset assembly includes a first knob assembly that couples to a second knob assembly for operation of a latch assembly on a door. The first knob assembly is disposed on an opposite side of the door from the second knob assembly, and thus makes connection and installation difficult while also ensuring security of the door. In the example, the first knob assembly includes screws that project from the assembly and which are received in corresponding openings in the second knob assembly. The screw/opening engagement is a bayonet connection and the second knob assembly is rotated and axially moved in order to couple the first knob assembly and the second knob assembly together. While the lockset assembly is in use, environmental forces and/or operational forces may undesirably back out the screws from engagement with the opening. As such, the retainer is provided so as to ensure screw alignment and retention in the openings.

The retainer is a separate component that couples to the existing structure of a rose insert. The retainer includes screw receivers that axially align with the openings and that engage with the screws. During assembly, the bayonet connection resiliently deflects the screw receivers as the screws are inserted into the openings. The screw receivers may be formed as an open pocket that captures at least a portion of the screws when they are within the openings so as to restrict the screws from being removed from the openings. In examples, the retainer may provide physical and/or audible feedback to the user for screw alignment and retention during installation.

FIG. 1 is a perspective view of an exemplary lockset assembly 100. The lockset assembly includes an exterior knob assembly 102 and an interior knob assembly 104, both coupled in operation via a torque blade 106. The torque blade 106 is configured to rotate, via operation by the exterior or interior knob assemblies 102, 104, around a first axis 108. Rotation of the torque blade 106 drives operation of a latch assembly (not shown) disposed between the exterior and interior knob assemblies 102, 104 and extend or retract a latch bolt.

The exterior knob assembly 102 includes a first knob 110 and a first rose 112. The first rose 112 is configured to be mounted against an exterior surface of a door (not shown) and the first knob 110 is configured to rotate around the first axis 108 to drive operation of the torque blade 106. First and second posts 114, 116 extend from the first rose 112 in an opposite direction of the first knob 110. The first and second posts 114, 116 are substantially parallel to the first axis 108 and the torque blade 106 is positioned therebetween. First and second screws 118, 120 extend from the distal ends of the first and second posts 114, 116. The posts and screws form projections extending from the exterior knob assembly 102 and are utilized to couple the exterior knob assembly 102 to the interior knob assembly 104 as described herein.

The interior knob assembly 104 includes a second knob 122 and a second rose 124. The second rose 124 is configured to be mounted against an interior surface of the door and the second knob 122 is configured to rotate around the first axis 108 to also drive operation of the torque blade 106. The interior knob assembly 104 is configured to receive the heads of the first and second screws 118, 120 in a bayonet type connection so as to secure the lockset assembly 100 to the door. After the first and second screws 118, 120 are received at the interior knob assembly 104, the second rose 124 provides access to the screws 118, 120 so that the screws 118, 120 can be tightened to secure the bayonet connection.

Typically, the exterior knob assembly 102 is mounted on the outside of the door, while the interior knob assembly 104 is mounted inside the door, while the latch assembly (not shown) is mounted in a bore formed in the door that is orthogonal to the first axis 108. The term "outside" or "exterior" is broadly used to mean an area outside the door and "inside" or "interior" is also broadly used to denote an area inside the door. With an exterior entry door, for example, the exterior knob assembly 102 may be mounted outside a building, while the interior knob assembly 104 may be mounted inside the building. In this example, the first knob 110 may include a key cylinder (not shown) or other operator that allows the lockset assembly 100 to have a locking functionality, while the second knob 122 includes a thumb turn (not shown) or other operator that allows the lockset assembly 100 to have a locking functionality. With an interior door, the exterior knob assembly 102 may be mounted inside a building, but outside a room secured by the lockset assembly 100, while the interior knob assembly 104 may be mounted into the secured room. With an interior door, the lockset assembly 100 may or may not include a locking functionality. The lockset assembly 100 is applicable to both interior and exterior doors as required or desired.

The term "lock" or "lockset" is broadly intended to include any type of lock, including, but not limited to, deadbolts, knob locks, lever handle locks, mortise locks, and slide locks, whether mechanical, electrical, or electro-mechanical locks. The locking points may have various mounting configurations and/or locations, including, but not limited to, mortised within the doorframe, mounted externally to the doorframe or support structure, and/or affixed directly to the door.

Figure 2:
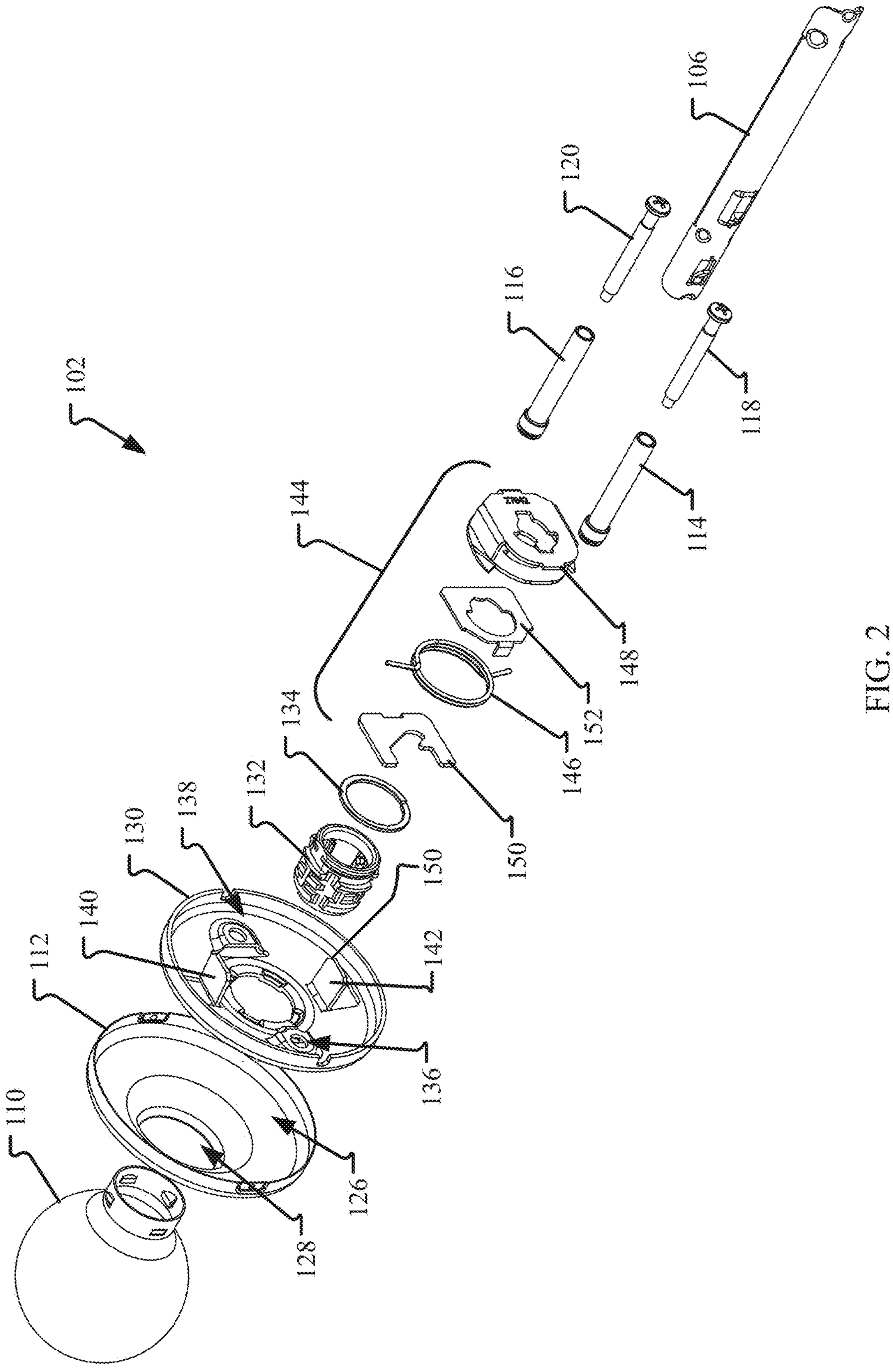
FIG. 2 is an exploded, perspective view of an exterior knob assembly of the lockset assembly shown in FIG. 1.

FIG. 2 is an exploded, perspective view of the exterior knob assembly 102. The exterior knob assembly 102 include the first knob 110 and the first rose 112. The first rose 112 defines an interior cavity 126 and a first opening 128. A first rose liner 130 is disposed within the interior cavity 126 and secures therein. A first knob insert 132 is configured to rotatably couple the first knob 110 to the first rose liner 130 via a first clip 134 as the first knob 110 extends through the first opening 128. The first rose liner 130 includes first and second openings 136, 138 that the first and second posts 114, 116 mount to and extend from. The first rose liner 130 also includes first and second tabs 140, 142 that project in the same direction as the first and second posts 114, 116.

The torque blade 106 couples to the first knob insert 132 such that the first knob 110 is configured to rotate the torque blade 106. The torque blade 106 extends through a bias assembly 144 that is configured to bias the torque blade 106 to a home rotational position (e.g., a position that corresponds to the bolt of the latch assembly being extended). The bias assembly 144 includes a torsion spring 146, a spring housing 148, and retention plates 150, 152. The retention plates 150, 152 capture the torsion spring 146 within the spring housing 148 and engage with the torque blade 106. The torsion spring 146 engages with the first and second tabs 140, 142 of the first rose liner 130 so as to bias the rotational orientation of the torque blade 106.

The first and second screws 118, 120 couple to the distal ends of the first and second posts 114, 116 so as to form projections extending substantially parallel to the torque blade 106. The first and second screws 118, 120 have an enlarged head and can rotate relative to the first and second posts 114, 116.

Figure 3:
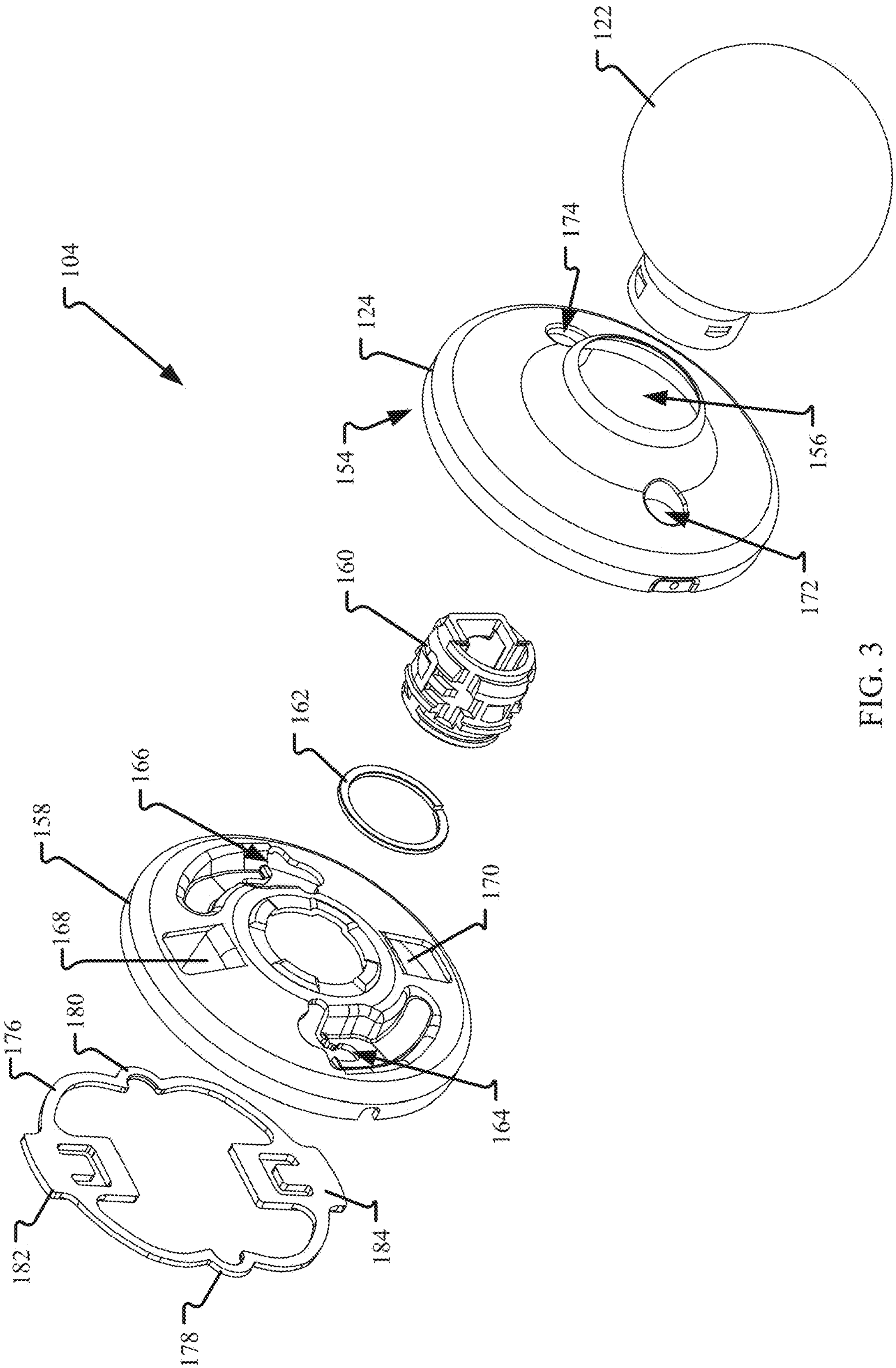
FIG. 3 is an exploded, perspective view of an interior knob assembly of the lockset assembly shown in FIG. 1.

FIG. 3 is an exploded, perspective view of the interior knob assembly 104. The interior knob assembly 104 includes the second knob 122 and the second rose 124. The second rose 124 defines an interior cavity 154 and a second opening 156. A second rose liner 158 is disposed within the interior cavity 154 and secures therein. A second knob insert 160 is configured to rotatably couple the second knob 122 to the second rose liner 158 via a second clip 162 as the second knob 122 extends through the second opening 156. The second rose liner 158 includes first and second openings 164, 166 that are configured to receive the heads of the first and second screws 118, 120 (shown in FIG. 2). The second rose liner 158 also includes first and second tabs 168, 170 that project outward. The second rose 124 includes first and second apertures 172, 174 that enable access to the screws 118, 120.

In order to install the lockset assembly 100 (shown in FIG. 1), the exterior knob assembly 102 (shown in FIG. 2) is aligned with a bore of a door and with the torque blade 106 (shown in FIG. 2) and the first and second screws 118, 120 projecting through the door. The free end of the torque blade 106 is inserted into the second knob insert 160 and then the second rose 124 and the second rose liner 158 are rotated around the first axis 108 (shown in FIG. 1) and axially displaced so as to capture the heads of the first and second screws 118, 120 within the first and second openings 164, 166 of the second rose liner 158 in a bayonet type connection. The first and second screws 118, 120 can further be tightened through the first and second apertures 172, 174 of the second rose 124 and which the screws align to. This operation and the components that facilitate it are described in further detail in U.S. Pat. No. 6,745,602 which is incorporated by reference in its entirety herein.

During operation of the lockset assembly 100, the heads of the first and second screws 118, 120 may undesirably back out and disengage from the first and second openings 164, 166 of the second rose liner 158. This may occur during use of the lockset assembly 100 (e.g., rotating the knobs to extend/retract the latch assembly) and/or with environmental conditions of the lockset assembly 100 (e.g., expansion/contraction of materials due to temperature changes), both which impart forces on the bayonet connection. As such, a retainer 176 is included in the interior knob assembly 104 to facilitate retaining the engagement between the first and second screws 118, 120 and the second rose liner 158 so as to restrict disengagement from the first and second openings 164, 166. The retainer 176 is configured to not interfere with the installation procedure of the lockset assembly 100 as described above. Rather, the retainer 176 is a passive component in the lockset assembly 100 that the end user does not need to actively engage.

The retainer 176 includes first and second screw receivers 178, 180 that are configured to engage with the first and second screws 118, 120 when the exterior and interior knob assemblies 102, 104 are coupled together. The retainer 176 also includes first and second tab receivers 182, 184 that are configured to engage with the first and second tabs 168, 170 to mount and couple the retainer 176 to the second rose liner 158.

Figure 4:
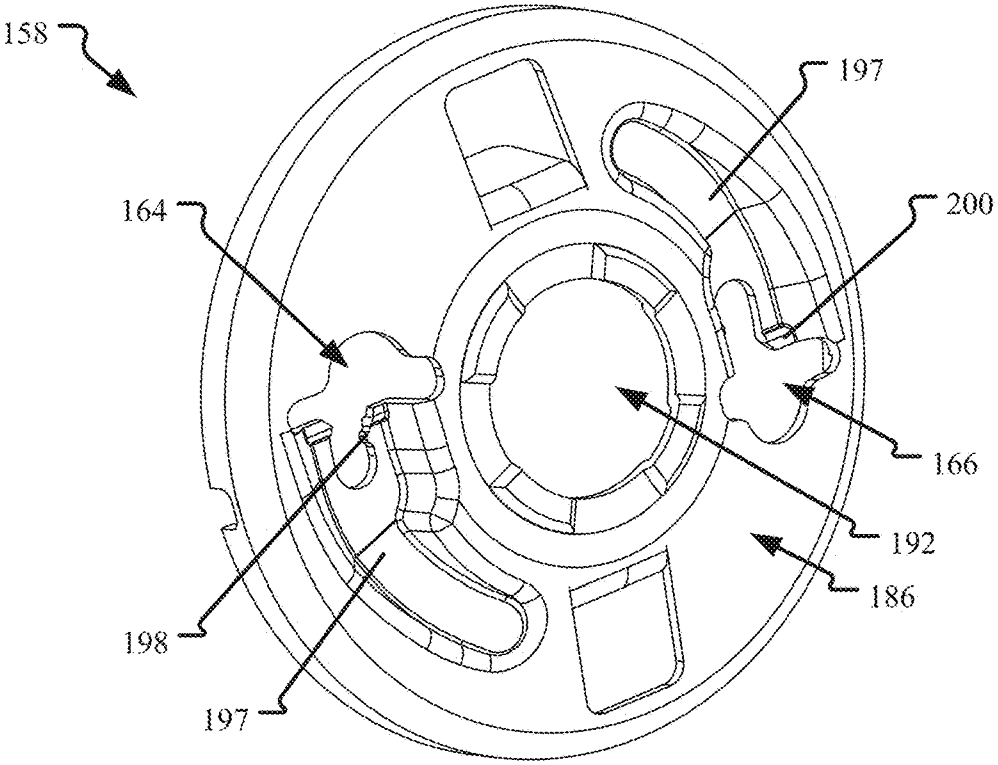
FIGS. 4 and 5 are perspective views of a rose liner for the interior knob assembly shown in FIG. 3.
Figure 5:
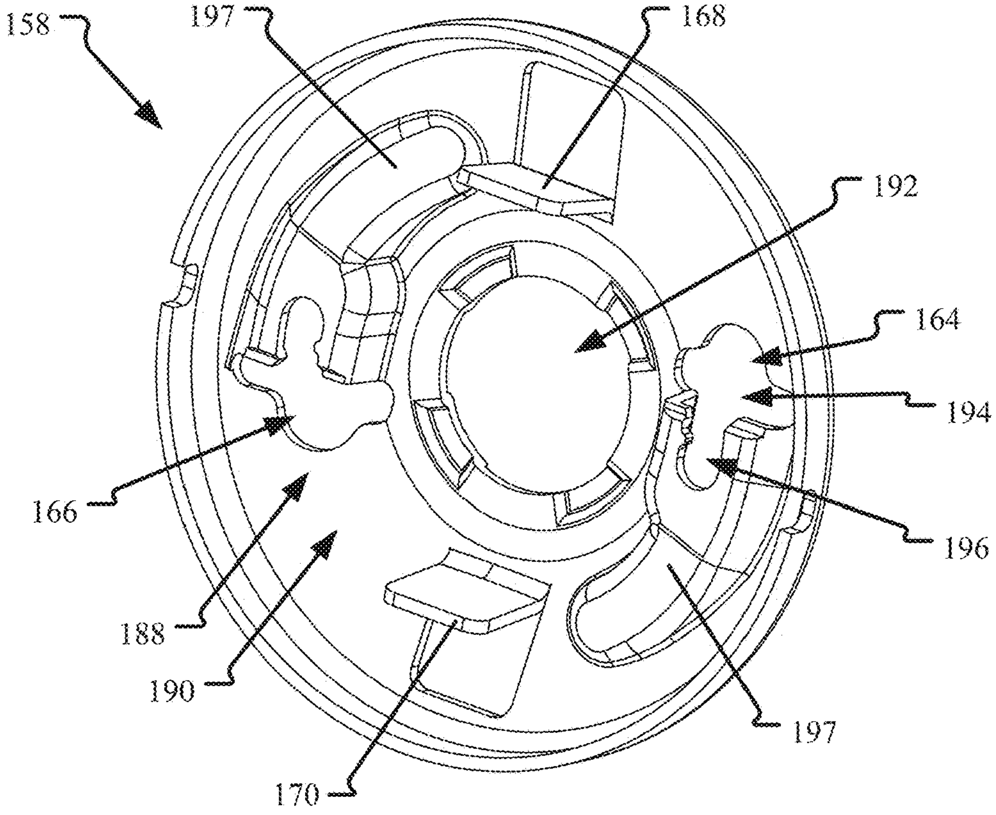

FIGS. 4 and 5 are perspective views of the second rose liner 158. Referring concurrently to FIGS. 4 and 5, the second rose liner 158 is substantially circular in shape and has a first side 186 configured to face the second rose 124 (shown in FIG. 3) and an opposite second side 188. The second side 188 is concave so as to define an interior cavity 190. The first and second tabs 168, 170 project into the cavity 190 and are disposed on opposite sides of an opening 192 for the second knob insert 160 (shown in FIG. 3). The first and second tabs 168, 170 may extend substantially parallel to the first axis 108 (shown in FIG. 1). In an aspect, the distal ends of the first and second tabs 168, 170 may taper inwards towards each other. The first and second tabs 168, 170 are spaced approximately 180° apart from one another. In the example, the second rose liner 158 may be formed from a metal material and manufactured via a stamping or pressing process.

The first and second openings 164, 166 are also defined within the second rose liner 158. The first and second openings 164, 166 are disposed on opposite sides of the opening 192 and between the first and second tabs 168, 170. The first and second openings 164, 166 are shaped and sized to receive the head of the screws 118, 120 in a bayonet connection. The first and second openings 164, 166 have an axial portion 194 and a circumferential portion 196. Proximate the axial portion 194, the openings 164, 166 are defined by a ramp 197. The ramp 197 extends in a circumferential direction and is a projection on the second side 188 and a recess on the first side 186 of the second rose liner 158.

During installation, when the second rose liner 158 is rotated in a first direction, the ramp 197 on the second side 188 slides against the screws 118, 120 so that the second rose liner 158 moves axially outward from the screws 118, 120 until the screw head reaches the openings 164, 166. At the openings 164, 166, the head of the screws 118, 120 are captured so that the second rose liner 158 can be moved axially inward towards the screws 118, 120 and rotated in an opposite second direction. The forms the bayonet connection between the screws 118, 120 and the second rose liner 158. The head of the screws 118, 120 are accessible from the first side 186 of the second rose liner 158 for further tightening.

The distal end of the ramp 197 that forms the circumferential portion 196 of the openings 164, 166 has a substantially "P" shape to capture the screws 118, 120. A radial detent 198 and an axial detent 200 formed at the distal end of the ramp 197 facilitate capture of the head of the screws 118, 120 and restricting the second rose liner 158 from rotating back out of the bayonet connection.

Figure 6:
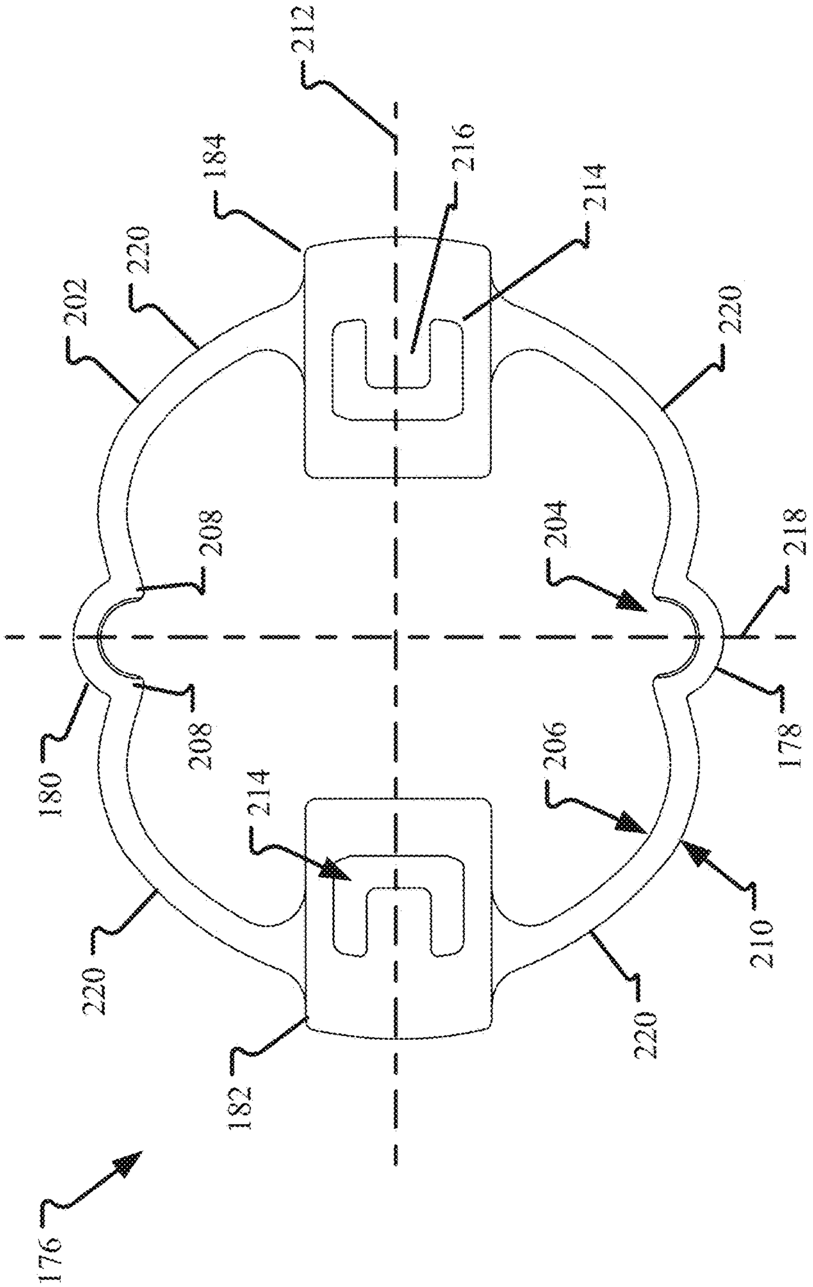
FIG. 6 is a plan view of a retainer for the interior knob assembly shown in FIG. 3.
Figure 7:
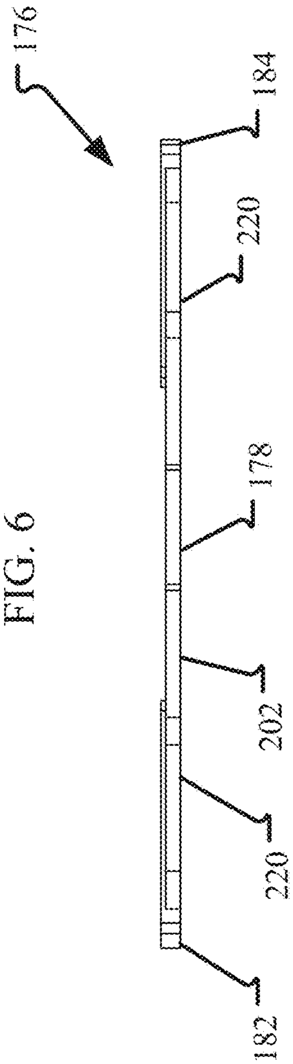
FIG. 7 is a side view of the retainer shown in FIG. 6.

FIG. 6 is a plan view of the retainer 176. FIG. 7 is a side view of the retainer 176. Referring concurrently to FIGS. 6 and 7, the retainer 176 is formed by a unitary main body 202 having a substantially circular shape. The main body 202 is formed with a plastic based resilient material that has some flexibility so as to enable the bayonet connection between the screws 118, 120 (shown in FIG. 2) and the second rose liner 158 (shown in FIG. 3), but also has sufficient rigidity to restrict the screws 118, 120 from undesirably backing out of the bayonet connection during use and/or environmental conditions. The main body 202 may be formed from a different material than the second rose liner 158. In an aspect, the main body 202 may be formed from polypropylene, acetal, or the like.

The main body 202 forms the first and second screw receivers 178, 180 and the first and second tab receivers 182, 184. In the example, the first and second screw receivers 178, 180 are formed by a pocket 204 formed on a radially inner surface 206 of the main body 202. The pocket 204 is shaped and sized to at least partially receive the screws 118, 120. In the example, the pocket 204 receives a shaft of the screws 118, 120. The pocket 204 is semi-circular in shape and is defined by edges 208 that project radially inward on the inner surface 206. A diameter of the pocket 204 may be about twice the diameter of the shaft of the screws 118, 120. In an aspect, the diameter of the pocket 204 may be about 1.5 to 2.0 times the diameter of the shaft of the screws 118, 120. Between the edges 208 the pocket 204 may be chamfered. The pocket 204 forms a projection on a radially outer surface 210 of the main body 202. The pocket 204 may be a notch, open nest, or the like and that receives the screws 118, 120.

In the example, the first and second screw receivers 178, 180 have the same size and shape. In other examples, the first and second screw receivers 178, 180 may have a different size and/or shape. The first screw receiver 178 faces the second screw receiver 180 and the main body 202 is symmetrical about a first directional plane 212. The first screw receiver 178 is spaced approximately 180° apart from the second screw receiver 180.

The first and second tab receivers 182, 184 are formed by a substantially rectangular mounting member defining a hole 214. In the example, the hole 214 is substantially U-shaped and defines a fin 216 and the first and second tab receivers 182, 184 face away from each other. The fin 216 is used to frictionally engage the tabs of the rose liner. In other examples, the hole 214 may be substantially square, substantially T-shaped, substantially C-shaped, or the like. The first and second tab receivers 182, 184 have the same size and shape. In other examples, the first and second tab receivers 182, 184 may have a different size and/or shape. The main body 202 is also symmetrical about a second directional plane 218 orthogonal from the first directional plane 212. The first tab receiver 182 is spaced approximately 180° apart from the second tab receiver 184. The rectangular member forms a projection on the radially outer surface 210 of the main body 202.

A plurality of arms 220 extend between a screw receiver and a tab receiver. Each of the arms 220 have the same radius of curvature. In the example, the arms 220 and the first and second screw receivers 178, 180 have the same thickness, while the first and second tab receivers 182, 184 have a larger thickness. In other examples, the main body 202 may have a uniformly consistent thickness.

Figure 8:
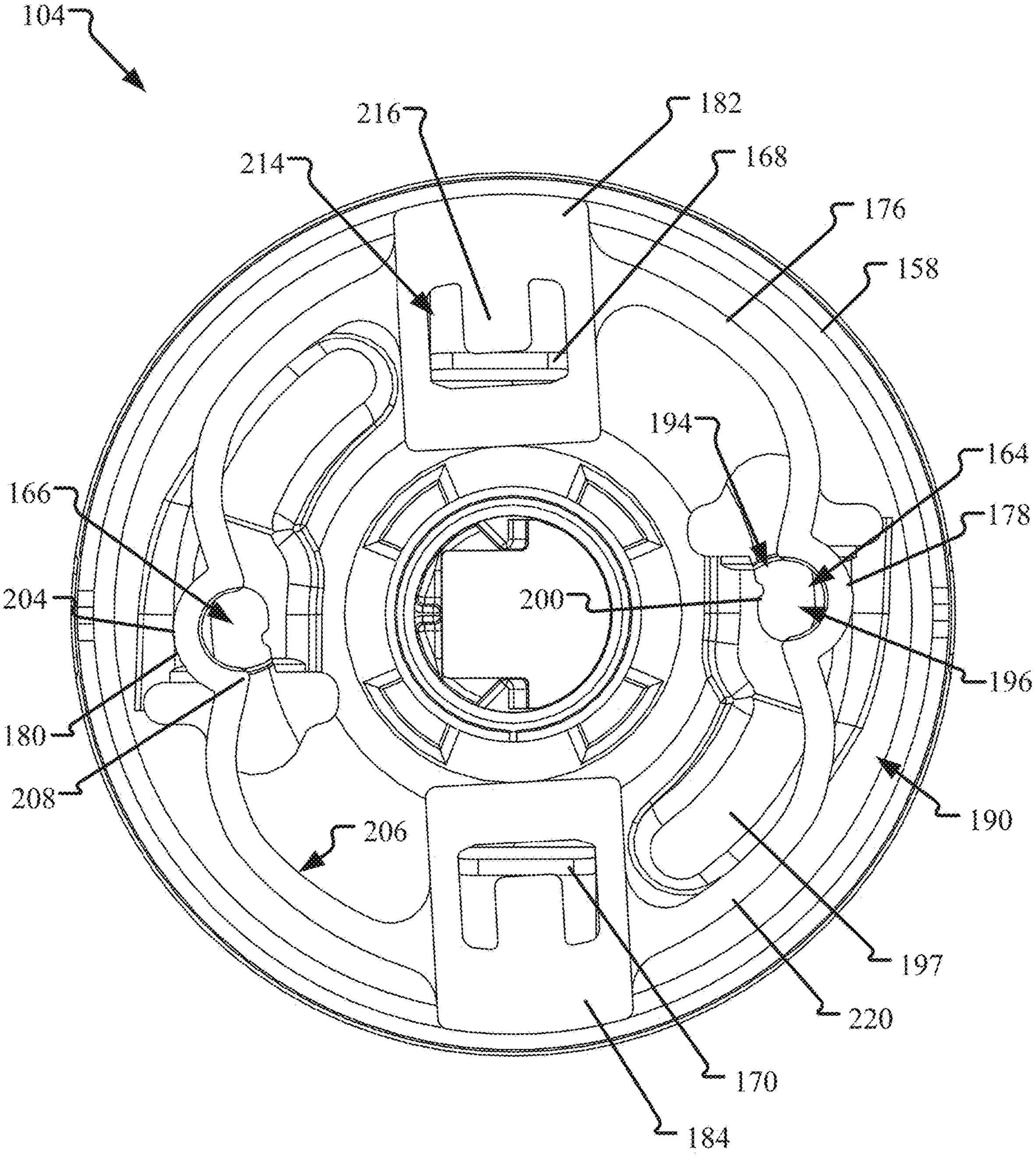
FIG. 8 is an interior view of the interior knob assembly shown in FIG. 3 with the retainer attached to the rose liner.

FIG. 8 is an interior view of the interior knob assembly 104 with the retainer 176 attached to the second rose liner 158. The retainer 176 is disposed completely within the interior cavity 190 of the second rose liner 158. The first and second tab receivers 182, 184 engage with the first and second tabs 168, 170 extending from the second rose liner 158. More specifically, the first and second tabs 168, 170 are received within the hole 214 of the first and second tab receivers 182, 184. The fin 216 facilitates coupling the first and second tab receivers 182, 184 to the tabs 168, 170 in a friction fit. Because the retainer 176 is symmetrical along the first directional plane 212 (shown in FIG. 6), the retainer 176 can be inserted into the second rose liner 158 with either side facing the second rose liner 158.

When the retainer 176 is coupled to the second rose liner 158, the first and second screw receivers 178, 180 axially align with the first and second openings 164, 166 of the second rose liner 158. In the example, the edge 208 of the pocket 204 covers the transition of the openings 164, 166 between the axial portion 194 and the circumferential portion 196, and opposite of the axial detent 200. Accordingly, the head of the screws 118, 120 (shown in FIG. 2) cannot be engaged with the second rose liner 158 unless the retainer 176 is resiliently deflected during insertion of the screws 118, 120 into the first and second openings 164, 166.

As illustrated in FIG. 8, the configuration of the retainer 176 may have the retainer 176 be rotationally offset relative to the second rose liner 158 relative to the longitudinal axis and visualized by the first and second tab receivers 182, 184 not being orthogonal to the tabs 168, 170. In an aspect, the retainer 176 may be offset about 5°, 3°, or 1° relative to the second rose liner 158. In other examples, the retainer 176 may not be rotationally offset and portions of the retainer 176 conform to the surface features of the second rose liner 158. In this example, the first and second tab receivers 182, 184 may be oriented orthogonally relative to the first and second tab receivers 182, 184.

The arms 220 of the retainer 176 are positioned radially outside of the ramp 197 of the second rose liner 158. As such, the arms 220 do not inhibit functionality of the ramp 197. Furthermore, the curvature of the inner surface 206 of the arms 220 facilitate directing the screws 118, 120 towards the openings 164, 166 upon rotation of the retainer 176 and second rose liner 158. In some examples, the arms 220 may at least partially cover the ramp 197 as required or desired.

Figure 9:
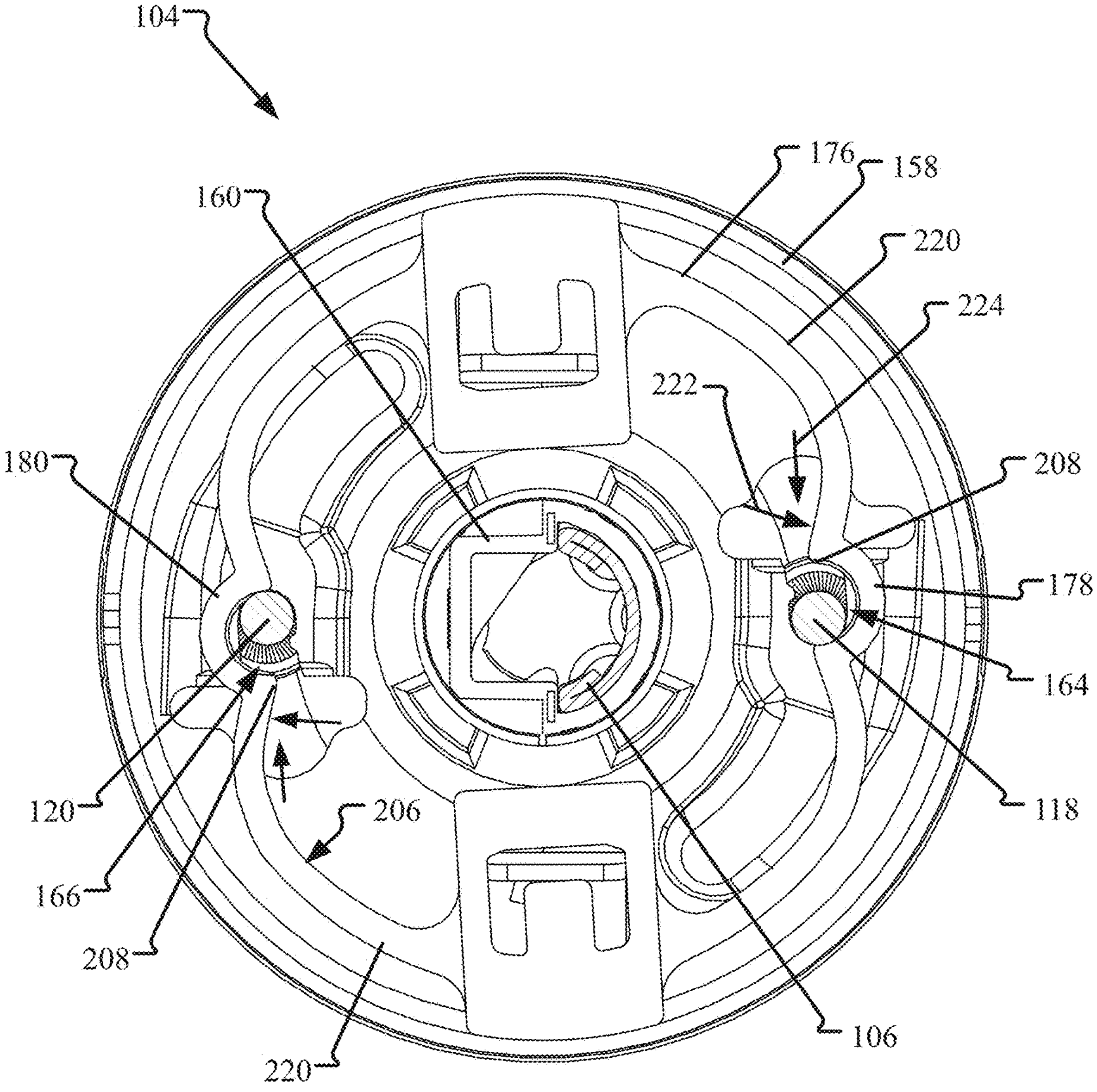
FIG. 9 is an interior view of the interior knob assembly shown in FIG. 3, with screws from the exterior knob assembly coupled thereto.

FIG. 9 is an interior view of the interior knob assembly 104, with the first and second screws 118, 120 coupled to the second rose liner 158. During installation, the torque blade 106 is inserted into the second knob insert 160. As the head of the screws 118, 120 are received within the first and second openings 164, 166 via rotation and axial movement of the bayonet coupling, the arms 220 of the retainer 176 resiliently deflect 222 substantially in a radial direction as the screws 118, 120 circumferentially slide 224 along the inner surface 206 and past the edge 208 to capture the screws 118, 120 within the first and second screw receivers 178, 180 and within the first and second openings 164, 166. Accordingly, the first and second screw receivers 178, 180 restrict disengagement of the head of the screws 118, 120 from the first and second openings 164, 166. The first and second screws 118, 120 when engaged with the first and second screw receivers 178, 180, the screws 118, 120 are selectively rotatable in order to tightened against the posts 114, 116 (shown in FIG. 1).

Furthermore, to decouple the screws 118, 120 from the second rose liner 158, the retainer 176 is resiliently flexible so that the screws 118, 120 can deflect the first and second screw receivers 178, 180 upon disassembly rotation and movement. However, the retainer 176 provides sufficient force so that operational use and/or environmental conditions do not overcome the retaining force provided by the first and second screw receivers 178, 180. As such, the retainer 176 is resilient flexible to allow the screws 118, 120 to be inserted into, and removed from, the first and second openings 164, 166. In an example, the torque required to disengage the screws 118, 120 from the retainer 176 is greater than the torque required to engage the screws 118, 120 with the retainer 176. In another example the torque is substantially equal to disengage and engage the screws 118, 120 with the retainer 176. The retainer 176 also enables the torque blade 106 to extend therethrough.

Figure 10:
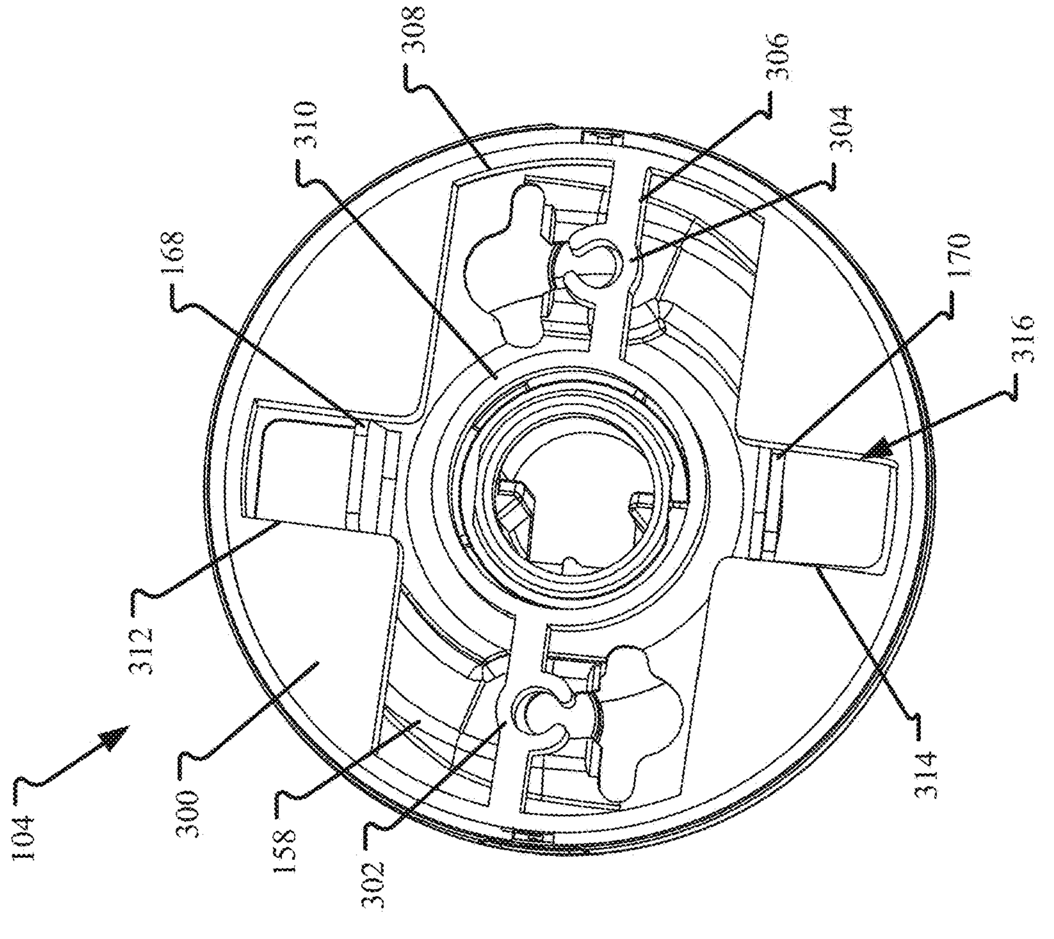
FIG. 10 is a perspective, interior view of the interior knob assembly shown in FIG. 3 with another retainer.

FIG. 10 in an interior view of the interior knob assembly 104 with another configuration of a retainer 300. The retainer 300 is configured to capture the screws from the exterior knob assembly and ensure screw alignment is correct while restricting disengagement of the screws from the second rose liner 158 and similar to the retainer described above. In this example, the main body of the retainer 300 includes first and second screw receivers 302, 304 that have a C-shape for engaging the screws. The first and second screw receivers 302, 304 are mounted on cross-bars 306 that extend between an outer peripheral ring 308 and an inner ring 310. First and second tab receivers 312, 314 are defined with channels 316 to engage the tabs 168, 170.

Figure 11:
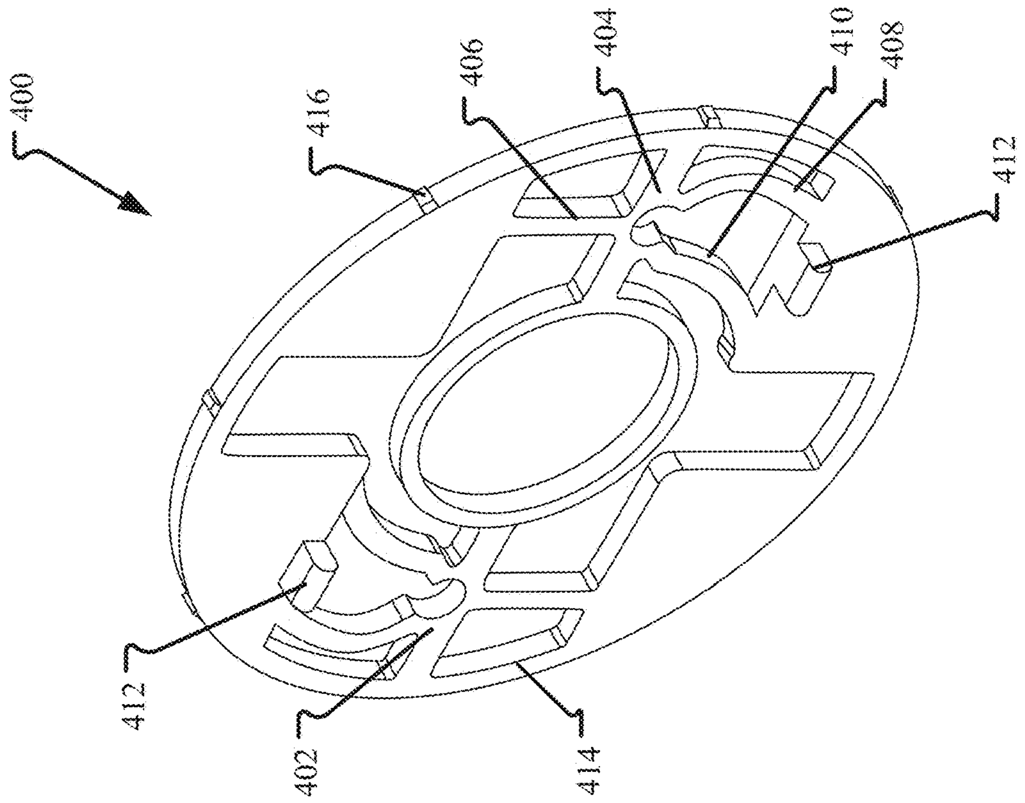
FIG. 11 is a perspective view of another retainer.

FIG. 11 is a perspective view of another retainer 400. In this example, the main body of the retainer 400 incudes first and second screw receivers 402, 404 with an additional support bar 406 on one side and a pair of insert arms 408, 410 on the other side. The insert arms 408, 410 facilitate channeling the screw towards the screw receivers 402, 404. Proximate the insert arms 408, 410, an axial flange 412 extends from the side of the retainer 400 that faces the rose liner. The axial flanges 412 facilitate proper insertion of the retainer 400 within the rose liner. An outer peripheral ring 414 includes a plurality of circumferentially spaced detents 416 for engaging the rose liner.

Figure 12:
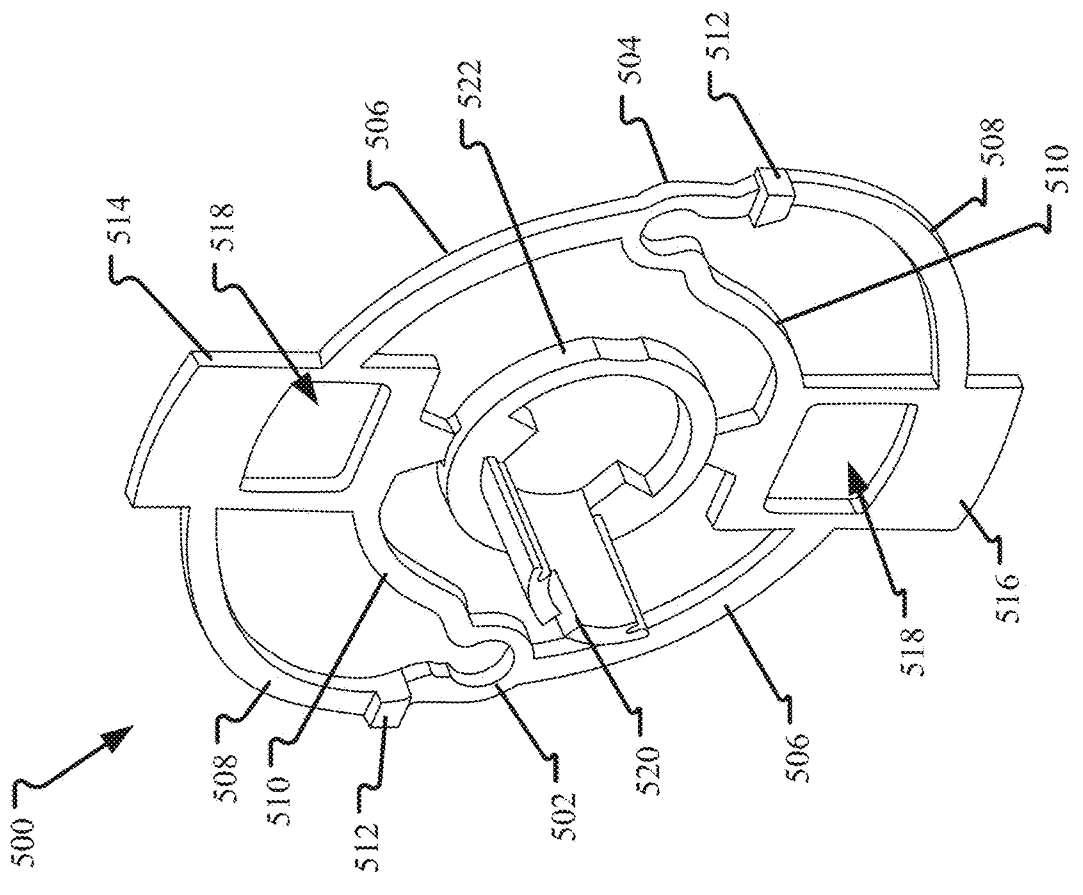
FIG. 12 is a perspective view of another retainer.

FIG. 12 is a perspective view of another retainer 500. In this example, the main body of the retainer 500 includes first and second screw receivers 502, 504 with a support bar 506 on one side that corresponds to the curvature of the ramp of the rose liner so that the support bar 506 can at least partially cover the ramp. On the other side of the first and second screw receivers 502, 504, insert arms 508, 510 are spaced further apart to increase the screw being captured by the retainer 500 and channeling the screw towards the screw receivers 502, 504. The insert arm 508 includes a lug 512 to facilitate positioning the screw receivers 502, 504 at the openings of the rose liner. The insert arms 508, 510 extend from first and second tab receivers 514, 516. The tab receivers 514, 516 define a substantially rectangular opening 518 to couple to the tabs. An axial flange 520 extends from an inner ring 522 and is configured to be received within the knob insert. The first and second tab receivers 514, 516 may connect to the inner ring 522.

Figure 13:
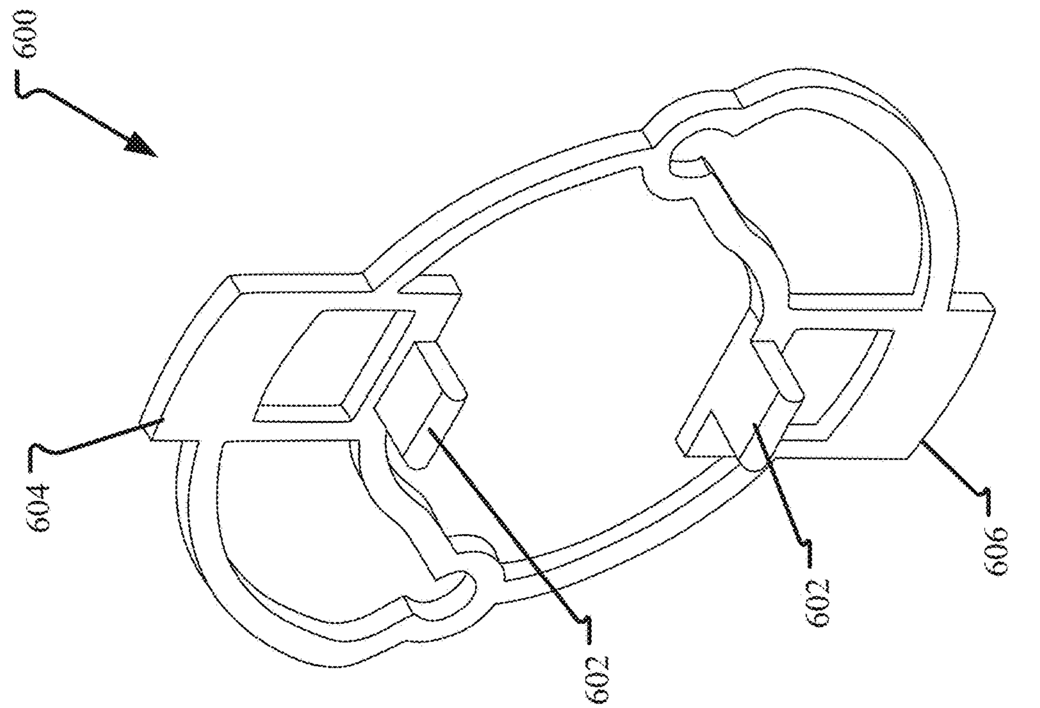
FIG. 13 is a perspective view of another retainer.

FIG. 13 is a perspective view of another retainer 600. In this example, the main body of the retainer 600 has axial flanges 602 extending from first and second tab receivers 604, 606. This configuration enlarges the open center to facilitate the installation process. The other features are similar to the retainer 500 described above with reference to FIG. 12.

Figure 14:
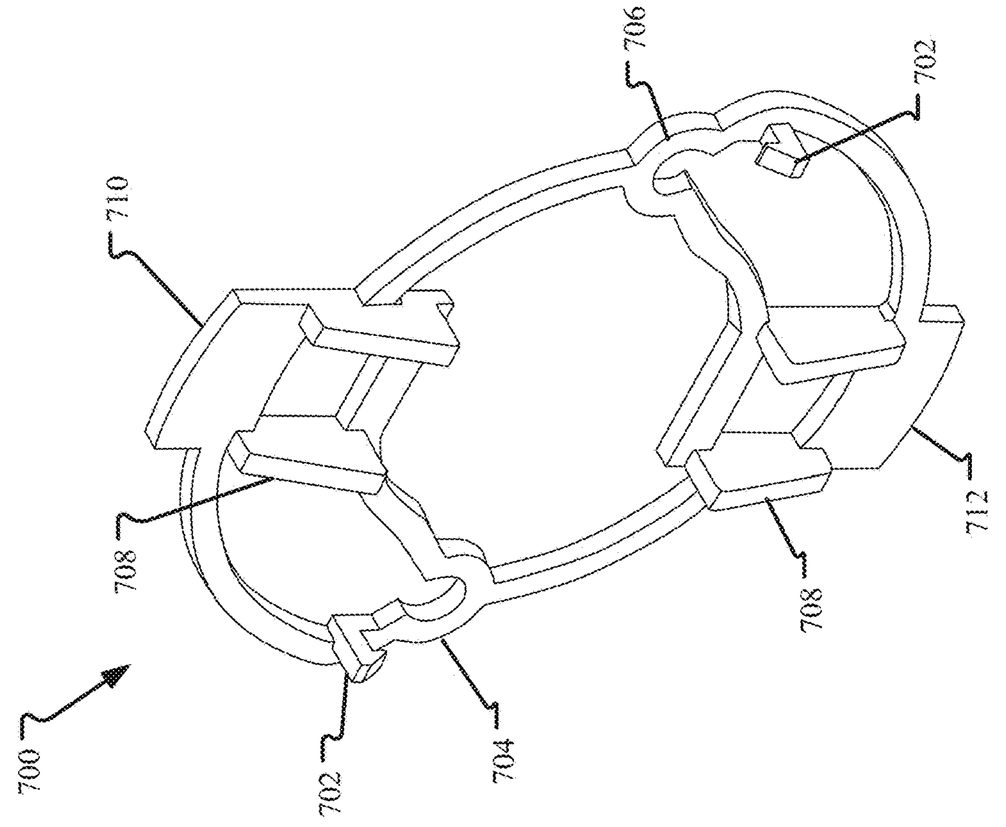
FIG. 14 is a perspective view of another retainer.

FIG. 14 is a perspective view of another retainer 700. In this example, the main body of the retainer 700 includes hooks 702 proximate first and second screw retainers 704, 706 for engaging the retainer 700 at the openings of the rose liner. Additionally, axial flanges 708 are disposed at first and second tab receivers 710, 712 that extend in a radial direction.

Figure 15:
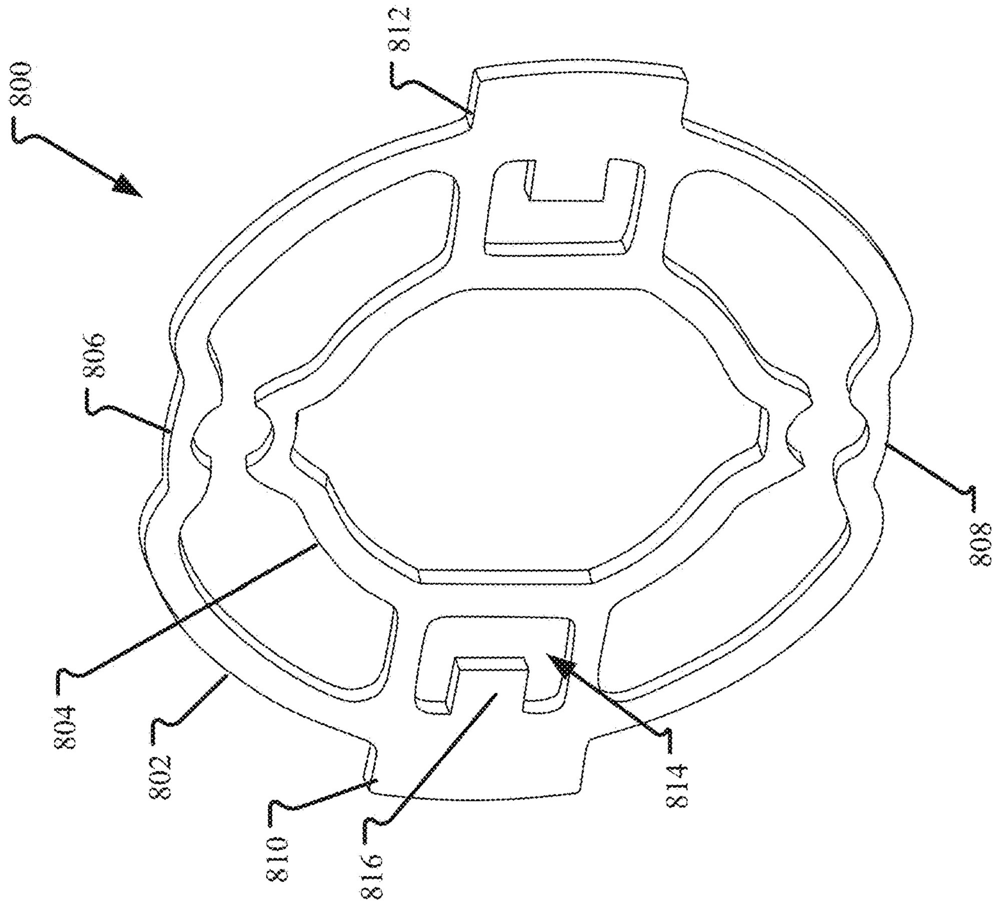
FIG. 15 is a perspective view of another retainer.

FIG. 15 is a perspective view of another retainer 800. In this example, the main body of the retainer 800 has a consistent thickness, and thus, either side can face the rose liner. The retainer 800 includes an outer ring 802 and an inner ring 804. First and second screw receivers 806, 808 are defined by pockets in both the rings 802, 802. First and second tab receivers 810, 812 define U-shaped openings 814 forming a fin 816.

Figure 16:
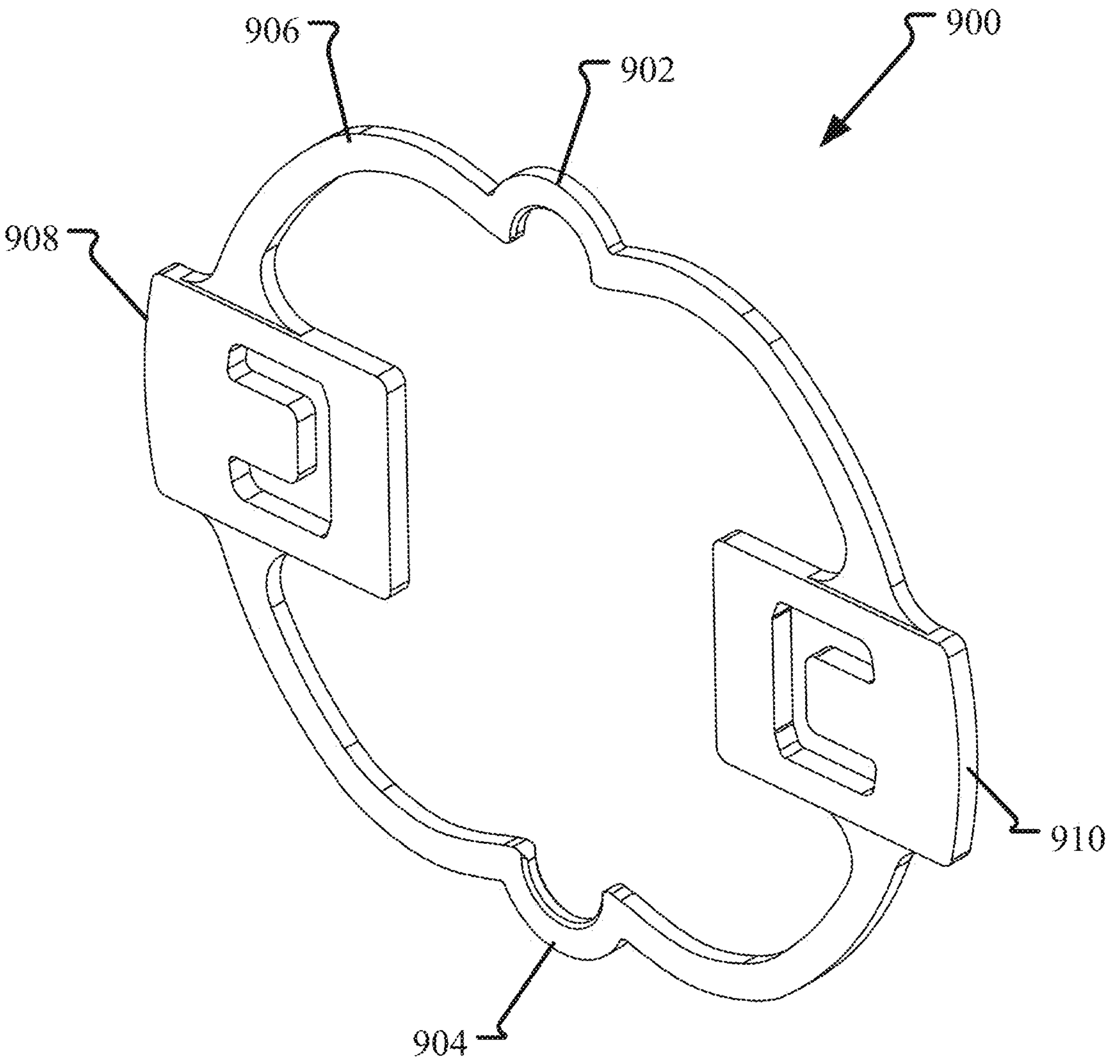
FIG. 16 is a perspective view of another retainer.

FIG. 16 is a perspective view of another retainer 900. In this example, the main body of the retainer 900 also has a consistent thickness. Additionally, the retainer 900 includes first and second screw receivers 902, 904 formed as pockets only in an outer ring 906. First and second tab receives 908, 910 are also included.

Figure 17:
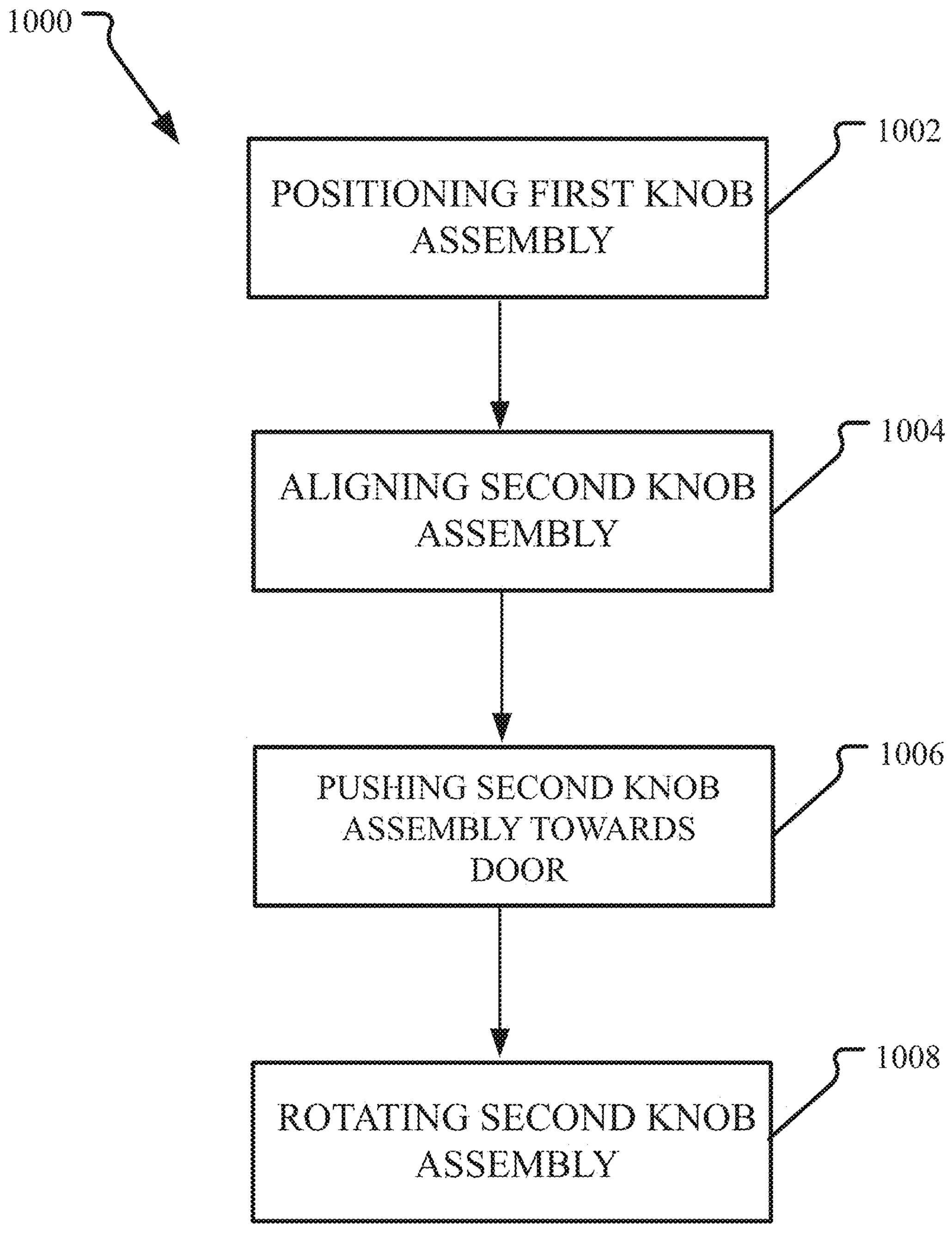
FIG. 17 illustrates a flowchart depicting a method of installing a lockset assembly on a door.

FIG. 17 illustrates a flowchart depicting a method 1000 of installing a lockset assembly on a door. The example methods and operations can be implemented or performed by the assemblies described herein (e.g., the lockset assembly 100 shown in FIGS. 1-5 and the retainers shown in FIGS. 6-18). The method 1000 begins with positioning a first knob assembly at a bore of the door that defines a first axis (operation 1002). The first knob assembly has at least one screw and a torque blade extending through the bore of the door. The torque blade configured to couple to a latch assembly to extend and retract a latch bolt upon rotation of the torque blade around the first axis. A second knob assembly is aligned at the bore of the door to couple to the torque blade (operation 1004).

Once the second knob assembly is aligned along the first axis, the second knob assembly is pushed towards the door axially along the first axis (operation 1006). Concurrently while pushing the second knob assembly, the second knob assembly is rotated around the first axis (operation 1008). The second knob assembly is configured to couple with the at least one screw of the first knob assembly in a bayonet style connection. More specifically, a rose liner of the second knob assembly has at least one opening that at least partially captures the at least one screw. Rotating the second knob assembly includes resiliently deflecting a retainer coupled to the rose liner to engage the at least one screw within at least one pocket restricting disengagement of the at least one screw from the at least one opening. The retainer provides feedback on the alignment of the screws within the rose liner. In an aspect, the feedback may be physical and/or audible. Additionally, the retainer restricts the screws from backing out of the bayonet connection.

In the example, once the at least one screw is connected to the rose liner and retainer, the screw can rotate relative to the retainer so as to tighten the screw relative to the second knob assembly. This allows the bayonet connection to be tightened from the exterior of the second knob assembly, while the retainer is still enabled for restricting the undesirable disconnection of the screws from the openings of the rose liner. While the retainer restricts the screws from undesirably backing out of the openings in the rose liner, it is appreciated that the retainers described herein still enable the lockset assembly to be disassembled in order to be removed from the door as required or desired. To disassemble the lockset assembly, the torque applied on the screws is sufficient to resiliently deflect the retainer.

During installation of the lockset assembly, prior to pushing the second knob assembly towards the first knob assembly, the second knob is rotated around first axis to position the at least one opening proximate the at least one screw with the screw sliding directly against the retainer. In an example, this rotation direction is opposite of the rotation direction that facilitates the bayonet connection.

The retainers described herein facilitate retaining the bayonet connection between the extending screws of a first knob assembly and the corresponding openings in a second knob assembly. The retainers do not require any structural modification to the lockset assembly; rather, the retainer is an additional component that restricts the screws from backing out of the openings when the lockset assembly is in operation. The retainers also do not inhibit or change the installation or disassembly operations of the lockset assembly.

Screw receivers are provided on the retainer that axially align with the openings on a rose liner on the second knob assembly. The screw receivers can resiliently deflect to enable the screws to be inserted into the openings, and then capture the screws to restrict the screws from undesirably backing out of the openings. The screw receivers may be an open pocket that engages the screws. The pocket provides physical and/or audible feedback to the user for screw alignment and retention for the lockset assembly.

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, may not be included or may be combined with other features.

References in the specification to “one example,” “an example,” “an illustrative example,” etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described. Additionally, it should be appreciated that items included in a list in the form of “at least one A, B, and C” can mean (A); (B); (C); (A and B); (A and C); (B and C); or (A, B, and C). Similarly, items listed in the form of “at least one of A, B, or C” can mean (A); (B); (C); (A and B); (A and C); (B and C); or (A, B, and C). Moreover, one having skill in the art will understand the degree to which terms such as “about,” “approximately,” or “substantially” convey in light of the measurement techniques utilized herein. To the extent such terms may not be clearly defined or understood by one having skill in the art, the term “about” shall mean plus or minus ten percent.

Throughout this description, references to orientation (e.g., front (ward), rear (ward), top, bottom, back, right, left, upper, lower, etc.) of the components of the lockset assembly relate to their position when installed on a door and are used for case of description and illustration only. No restriction is intended by use of the terms regardless of how the components of the lockset assembly are situated on its own. As used herein, the terms “axial” and “longitudinal” refer to directions and orientations, which extend substantially parallel to a centerline of the component or system. Moreover, the terms “radial” and “radially” refer to directions and orientations, which extend substantially perpendicular to the centerline of the component or system. In addition, as used herein, the term “circumferential” and “circumferentially” refer to directions and orientations, which extend arcuately about the centerline of the component or system.

From the forgoing detailed description, it will be evident that modifications and variations can be made in the aspects of the disclosure without departing from the spirit or scope of the aspects. While the best modes for carrying out the many aspects of the present teachings have been described in detail, those familiar with the art to which these teachings relate will recognize various alternative aspects for practicing the present teachings that are within the scope of the appended claims.

What is claimed:

1. A lockset assembly comprising:

a first knob assembly including at least one projection having an enlarged head;

a second knob assembly configured to couple to the first knob assembly along a first axis, the second knob assembly including a rose liner having at least one first opening configured to receive the enlarged head of the at least one projection in a bayonet connection; and a retainer coupled to the rose liner, the retainer defining at least one pocket shaped and sized to at least partially receive the at least one projection, the at least one pocket axially aligned with the at least one first opening, wherein the at least one pocket is a notch with a center axis parallel to the first axis and the notch having a second opening such that the at least one projection is slidably received into the notch through the second opening, and wherein as the enlarged head is received within the at least one first opening, the retainer resiliently deflects to capture the at least one projection within the at least one pocket restricting disengagement of the enlarged head from the at least one first opening.

2. The lockset assembly of claim 1, wherein the retainer has a substantially circular shape.

3. The lockset assembly of claim 2, wherein the retainer is symmetrical about the first axis.

4. The lockset assembly of claim 2, wherein the at least one pocket is defined on an inner surface of the retainer.

5. The lockset assembly of claim 2, wherein edges defining the notch project radially inward from an inner surface of the retainer.

6. The lockset assembly of claim 1, wherein the at least one first opening includes an axial portion and a circumferential portion, a portion of the at least one pocket covering a transition between the axial portion and the circumferential portion.

7. The lockset assembly of claim 1, wherein the retainer includes at least one tab receiver configured to engage a corresponding tab of the rose liner.

8. The lockset assembly of claim 7, wherein the at least one tab receiver is a U-shaped hole, a square shaped hole, or a T-shaped hole.

9. A lockset assembly comprising:

a first knob assembly comprising:

a first knob rotatable around a first axis;

a first rose liner; and at least one screw projecting from the first rose liner opposite the first knob and parallel to the first axis; and a second knob assembly comprising:

a second knob rotatable around the first axis, the second knob coupled to the first knob via a torque blade;

a second rose liner defining at least one first opening configured to receive at least a portion of the at least one screw in a bayonet coupling; and a retainer coupled to the second rose liner, the retainer having at least one screw receiver disposed proximate the at least one first opening, the at least one screw receiver restricting disengagement of the at least one screw from the at least one first opening, wherein the at least one screw receiver is a notch with a center axis parallel to the first axis and the notch having a second opening such that the at least one screw is slidably received within the notch through the second opening, wherein the retainer is formed from a different material than the second rose liner, and wherein the retainer is resiliently flexible to allow the at least one screw to be inserted into, and removed from, the at least one first opening.

10. The lockset assembly of claim 9, wherein the at least one screw receiver is a pocket.

11. The lockset assembly of claim 9, wherein the at least one screw is selectively rotatable when received at least partially within the at least one screw receiver.

12. The lockset assembly of claim 9, wherein the second rose liner includes at least one ramp proximate the at least one first opening, the retainer disposed radially outside of the at least one ramp.

13. The lockset assembly of claim 9, wherein the second rose liner defines an interior cavity, the retainer completely disposed within the interior cavity.

14. The lockset assembly of claim 9, wherein the torque blade extends through the retainer.

15. A method of installing a lockset assembly on a door, the method comprising:

positioning a first knob assembly at a bore of the door that defines a first axis, the first knob assembly having at least one screw and a torque blade extending through the bore of the door;

aligning a second knob assembly at the bore of the door to couple to the torque blade;

pushing the second knob assembly towards the door; and concurrently while pushing the second knob assembly, rotating the second knob assembly around the first axis such that a rose liner having at least one first opening at least partially captures the at least one screw in a bayonet connection, wherein rotating the second knob assembly resiliently deflects a retainer coupled to the rose liner to engage the at least one screw within at least one pocket restricting disengagement of the at least one screw from the at least one first opening, wherein the at least one pocket is a notch with a center axis parallel to the first axis and the notch has a second opening such that the at least one screw is slidably received into the notch through the second opening.

16. The method of claim 15, wherein capturing the at least one screw within the at least one pocket includes generating an audible sound.

17. The method of claim 15, further comprising tightening the at least one screw, wherein the at least one screw rotates relative to the retainer.

18. The method of claim 15, further comprising prior to pushing the second knob assembly, rotating the second knob assembly around the first axis to position the at least one first opening proximate the at least one screw, the at least one screw sliding directly against the retainer.

19. A lockset assembly comprising:

a first knob assembly including at least one projection having an enlarged head;

a second knob assembly configured to couple to the first knob assembly along a first axis, the second knob assembly including a rose liner having at least one opening configured to receive the enlarged head of the at least one projection in a bayonet connection; and a retainer coupled to the rose liner, the retainer defining at least one pocket shaped and sized to at least partially receive the at least one projection, the at least one pocket axially aligned with the at least one opening, wherein as the enlarged head is received within the at least one opening, the retainer resiliently deflects to capture the at least one projection within the at least one pocket restricting disengagement of the enlarged head from the at least one opening, and wherein the retainer includes at least one tab receiver configured to engage a corresponding tab of the rose liner.

* * * * *